United States Patent
Hoang

(10) Patent No.: US 10,282,249 B1
(45) Date of Patent: *May 7, 2019

(54) SYSTEM AND METHOD FOR RESTORING DELETED OBJECTS AND THEIR ASSIGNMENTS TO OTHER OBJECTS BASED ON ANY DELETION OF THE OTHER OBJECTS

(71) Applicant: Charles Schwab & Co., Inc., San Francisco, CA (US)

(72) Inventor: Huynh Hoang, San Francisco, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,572

(22) Filed: Nov. 6, 2017

Related U.S. Application Data

(63) Continuation of application No. 14/341,832, filed on Jul. 27, 2014, now Pat. No. 9,811,412.

(60) Provisional application No. 61/859,164, filed on Jul. 26, 2013.

(51) Int. Cl.
*G06F 17/30* (2006.01)
*G06F 11/08* (2006.01)

(52) U.S. Cl.
CPC .......... *G06F 11/08* (2013.01); *G06F 2201/80* (2013.01)

(58) Field of Classification Search
CPC .............................. G06F 11/08; G06F 2201/80
See application file for complete search history.

(56) References Cited

U.S. PATENT DOCUMENTS

| | | | | |
|---|---|---|---|---|
| 8,484,163 | B1 * | 7/2013 | Yucel | G06F 17/30289 370/216 |
| 8,862,541 | B1 * | 10/2014 | Cox | H04L 67/1095 707/610 |
| 2015/0212898 | A1 * | 7/2015 | Kleynhans | G06F 11/1469 707/679 |
| 2016/0110266 | A1 * | 4/2016 | Nara | G06F 11/1456 707/680 |
| 2017/0235950 | A1 * | 8/2017 | Gopalapura Venkatesh | G06F 8/65 726/24 |
| 2018/0157561 | A1 * | 6/2018 | Venkatesh | G06F 8/63 |

* cited by examiner

*Primary Examiner* — Tyler J Torgrimson
(74) *Attorney, Agent, or Firm* — Innovation Partners; Charles E. Gotlieb

(57) ABSTRACT

A system and method on one computer records actions on objects performed on a second computer. If an object is deleted from the second computer, the first computer can restore to a point in time the state of the object on the second computer, including assignments made between it and other objects, using the recorded actions.

12 Claims, 3 Drawing Sheets

SYSTEM AND METHOD FOR RESTORING DELETED OBJECTS AND THEIR ASSIGNMENTS TO OTHER OBJECTS BASED ON ANY DELETION OF THE OTHER OBJECTS

CROSS REFERENCE TO RELATED APPLICATIONS

This application is a continuation of U.S. patent application Ser. No. 14/341,832 entitled "System and Method for Restoring Deleted Objects and Their Assignments to Other Objects" filed by Huynh Hoang on Jul. 27, 2014, which claims the benefit of U.S. Provisional Patent Application Ser. No. 61/859,164 entitled, "Method and Apparatus for Restoring Deleted Objects and Their Assignments to Other Objects" filed by Huynh Hoang on Jul. 26, 2013, each having the same assignee as the present invention and each is incorporated by reference in its entirety.

FIELD OF THE INVENTION

The present invention is related to computer software and more specifically to computer software for restoration of deleted objects.

BACKGROUND OF THE INVENTION

Computer software may allow the user to define objects, assign attribute values to keys of those objects (which may be predefined or defined by the user), assign one object to one or more other objects, and delete objects. It can be desirable to operate such software in new ways.

SUMMARY OF INVENTION

A system and method on a first computer system receives from a second computer system and records on the first computer system, indications of actions performed on objects of the second computer system. The actions may include creation of an object, changes in attributes of an object, creation or deletion of an assignment of one or more objects to another object, or deletion of an object.

The second computer system does not have the capability to restore a deleted object to the state it had at a point in time. A user may use the first computer system to restore on the second computer system, to the same state it had at a specified point in time, an object that had been deleted from the second computer system. The first computer system restores the object to the point in time using the recorded actions. Communication between the first and second computer systems may be made via an API.

DETAILED DESCRIPTION OF A PREFERRED EMBODIMENT

Figure 1:
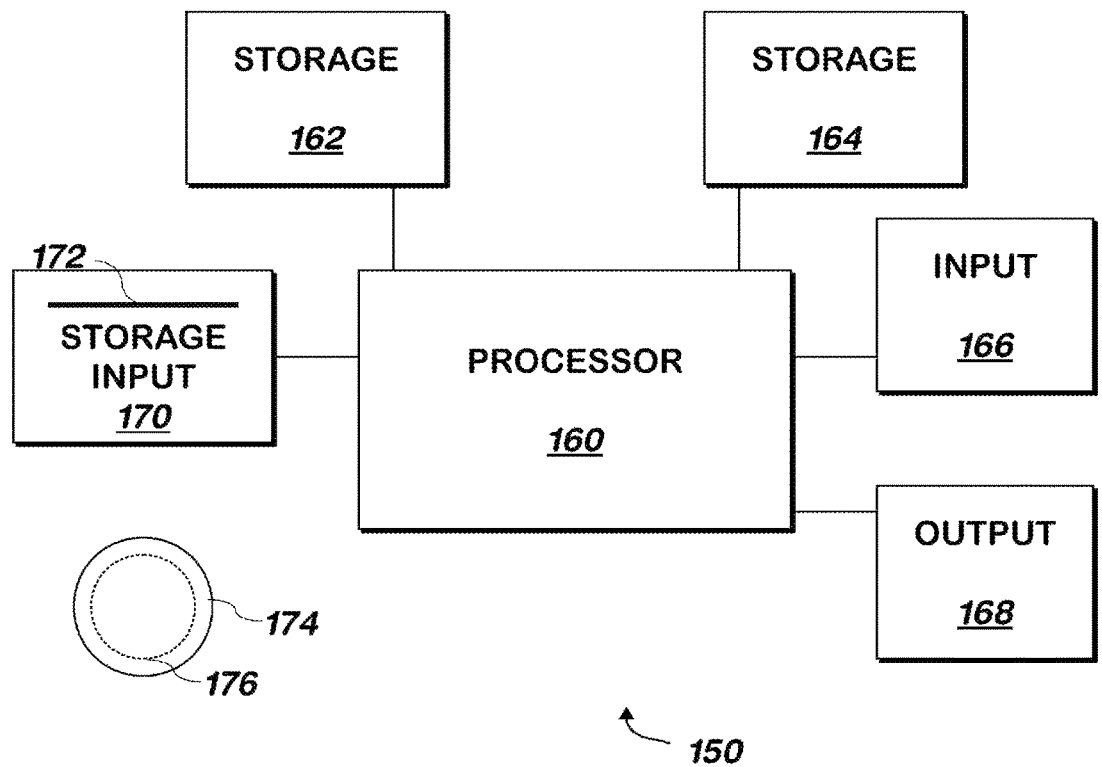
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY NEXUS III commercially available from SAMSUNG ELECTRONICS GLOBAL of Seoul, Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Figure 2:
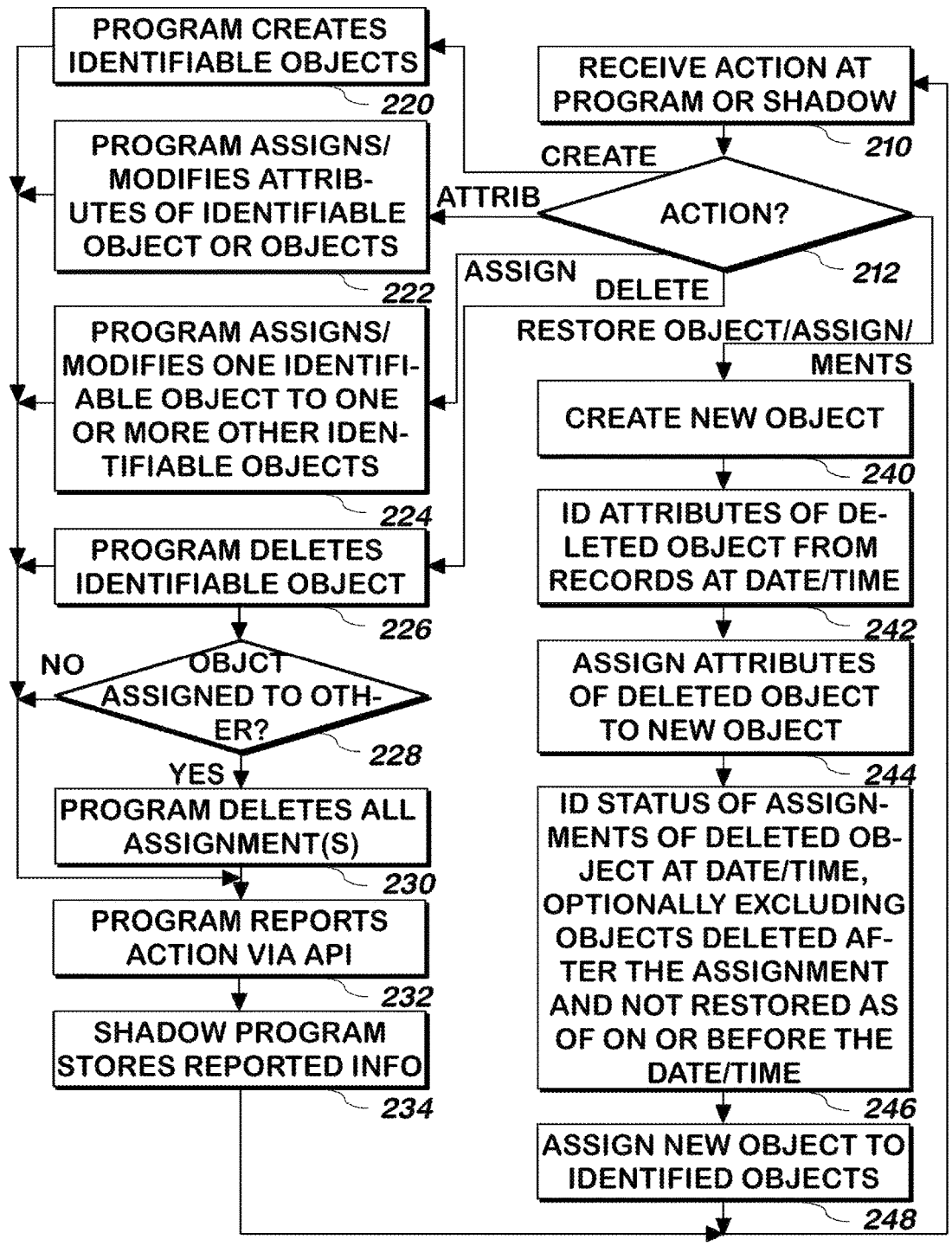
FIG. 2, is a flowchart illustrating a method of defining objects and their assignments, deleting objects, and restoring the state of objects at a point in time according to one embodiment of the present invention.

Referring now to FIG. 2, a method of performing actions on objects is shown according to one embodiment of the present invention. The present invention operates using two computer programs: one is referred to as the base program, and the other is referred to as the shadow program.

An action is received at the base program or the shadow program 210. In one embodiment, the base program may be used to receive actions that create objects, assign or adding attributes of objects, assign one object to another object, or delete an object. The shadow program may be used to receive actions that restore deletions on the base program to a point in time. In one embodiment, the shadow program is a computer program that is separate from the base program, and that receives data from the base program and can control the base program for example via an API. In one embodiment, these two programs are distributed by companies that are independent from one another, i.e. one company does not control the other and vice versa.

In one embodiment, objects describe sets of one or more skills, people who have those skills, and tasks requiring such skills. Attributes are components of objects, such as individual skills in a set of skills corresponding to an object.

Any number of actions may be performed on the same object, and there may be any number of objects on which the actions are performed. Thus, the method of FIG. 2 may be iterated any number of times, on multiple objects using all of the actions described.

If the action is an indication to create an object 212, the object is created and stored on the base program. In one embodiment, each object has at least one attribute, which may be supplied as part of the action of creating the object, and such attributes are stored by the programs that receive them, associated with the object to which they correspond. As described below, attributes of objects may be modified or added. In one embodiment, attribute values are associated with keys that define what the attribute is, and such keys may be predefined or defined by the user. When attribute values are received, they are received with their keys or an indication of the key to which that attribute value corresponds. In one embodiment, attribute values may include the name or other identifier of the object and other information. If the user does not define attribute values for some or all keys, default values may be assigned. In one embodiment, all objects described herein are identifiable by an identifier of the object. The method continues at step 232.

At step 232, the base program outputs an indication of the action, the object identifier or identifiers, and any new or changed attribute values via the API. The shadow program receives the action indication and attribute values and stores 234 them internally, with the date and time they were received. In one embodiment, any attributes output and received include the identifier of the object to which the attribute belongs, and the action. The method continues at step 210. Any number of actions may be received via step 210. When an action is received, an iteration of steps 232 and 234 are performed as described herein.

If the action is an indication to modify attributes of an object 212, the identifier of the object whose attributes should be modified and the value of the attributes are received as part of step 210, such attribute values are substituted for any prior attribute values 222, and the method continues at step 232, where the object identifier and attribute values and keys for which the attribute values correspond are reported, and received, time stamped and stored by the shadow program at step 234. Deletion of attribute values may be performed by modifying an attribute with an empty or null value. Although one object is described herein, the action may be used to modify attributes of multiple objects, in which case the report of the action that is provided, received and stored includes the identifiers of the objects or a means of identifying them, such as a range of identifiers.

If the action is to assign an object to one or more other objects or remove such assignment 212, the identifiers of the objects and an indication of the assignment or assignments to be made are received as part of step 210, the program makes and stores such assignments or removal 224 and the method continues at step 232, where the indication of the assignment or removal, and the object identifiers involved are output by the base program, and received, time stamped and stored by the shadow program at step 234. An assignment may be modified by deleting the current assignment and making the new assignment. The method continues at step 210 following step 234 in one embodiment, in another embodiment, the method continues at step 210 following step 232.

If the action is to delete an object, the identifier of the object is received as part of step 210, the program deletes the object 226, and if the object being deleted was assigned to another object, or if any other object was assigned to the object being deleted 228, any assignments made to that object, and/or any assignments of the object made to another object are deleted 230. Steps 228 and 230 may be performed in either order. The method continues at step 232, where the identifier of the object, and any assignments that were deleted, are reported by the base program, and received and stored by the shadow program 234, along with the time stamp. The method continues at step 210.

If the action is to restore a deleted object 212, the object identifier and restoration date and time to which the object should be restored is received as part of step 210, and the method continues at step 240. In one embodiment if no date and time is specified, the date and time just prior to the time the object was most recently deleted is used as the date and time. In one embodiment, an action to restore a deleted object is received on the shadow program, while other actions may be received on either or both programs, or the base program.

In one embodiment, the user indicates as part of the action whether the assignment status of a restored object should also be restored and in which direction or directions: to the deleted object, from the deleted object, or both. In one embodiment, restoration of assignments in both directions is the default for this action.

At step 240, the API is used on the shadow to create a new object on the base program using the identifier of the deleted object, or an identifier corresponding to such identifier. The information stored for that object at the shadow program under one or more iterations of step 234 is used to identify the state of the attributes as of the received date and time 242, and the shadow program uses the API to set the values of the attributes of the newly created object to that state 244. The information stored in the shadow program under one or more iterations of step 234 is used to identify the status of assignments of other objects to the object, and/or of the object to other objects, (optionally corresponding to the direction or directions of assignments indicated by the user as described above) as of the date and time received 246, and the shadow program uses the API to make such assignments to or of the newly created object on the base program so that the state of the object and assignments as of the date and time is restored. The method continues at step 210.

In one embodiment, step 246 includes identifying objects that were part of an assignment with the specified object that have been deleted after the assignment to them was made and that were not restored to a point in time after that time but before the date and time specified by the user, and excluding them from the assignments made with the new object, as described in more detail below. In another embodiment, all other objects deleted after the assignment was made are ignored when restoring assignments with the specified object, in yet another embodiment, any other object deleted after the specified date and time is restored, and in still another embodiment, the user may select which, if any other objects are ignored or restored.

Figure 3:
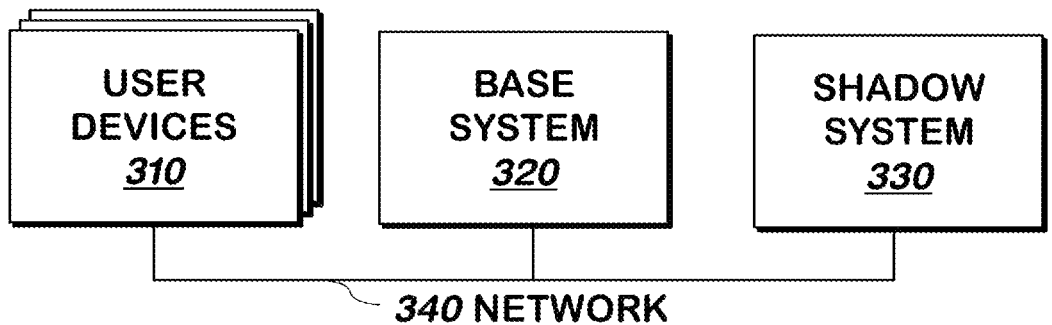
FIG. 3 is a block schematic diagram of a system for defining objects and their assignments, deleting objects, and restoring the state of objects at a point in time according to one embodiment of the present invention.

Referring now to FIG. 3, a system for restoring objects and their assignments is shown according to one embodiment of the present invention. User devices 310 may include conventional personal computers, or smart devices such as tablets or smart phones and are used by users to interact with the base system 320, the shadow system 330, or both via network 340. Network 340 includes a conventional Ethernet network, the Internet, or both. Base system 320 may include a conventional personal computer or server computer operating the base program as described above. Base system 320 does not have the capability to restore deleted objects and/or their assignments to one another. Shadow system 330 may include a conventional personal computer or server computer operating the shadow program as described above. Base system 320 and shadow system 330 communicate via network 340 and are different computer systems, physically separate from one another.

A user may use base system 320 to perform the create, modify attribute, assign one object to one or more other object, or delete actions as described above. In such event, base system 320 performs such action and internally stores the result. Additionally, base system 320 reports the action to the shadow system via the API described above.

Figure 4:
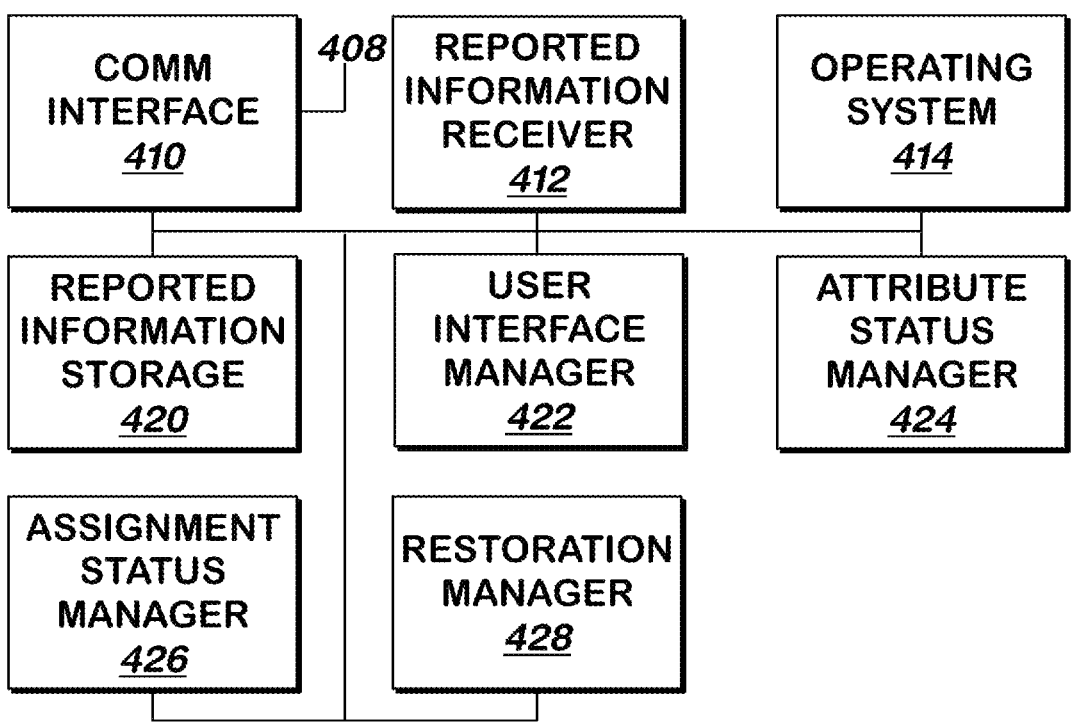
FIG. 4 is a block schematic diagram illustrating shadow system 330 of FIG. 3 according to one embodiment of the present invention.

In one embodiment, a user may use shadow system 330 to perform the actions described herein. FIG. 4 shows shadow system 330 according to one embodiment of the present invention. Shadow system 330 includes communication interface 410, coupled to network 340 via input/output 408. Communication interface 410 includes a conventional communication interface capable of communicating via Ethernet, TCP/IP and other communication protocols. The user may provide indications of the create, modify attribute, assign one object to one or more other object, or delete actions to a user interface provided by user interface manager 422, which receives indications of them and forwards them to base system 320 via the API. Base system 320 performs such action and internally stores the result, and reports the action to shadow system 330 via the API, as described above. Each action may be received with the other information described above, and if any such action is received by user interface manager 422, it also forwards such other information to base system 320 with the indication of the action.

Reported information receiver 412 receives the reported information from the base system 320 via the API, requests the current date and time from operating system 414, and stores the reported information (including an indication of the action, one or more object identifiers, attribute keys and values, assignment information including direction of the assignment and whether the assignment is being deleted or added, and the current date and time in reported information storage 420. Reported information storage 420 includes conventional electronic disk or memory storage and may include a conventional database.

The user may use the user interface provided by user interface manager 422 to request restoration of a deleted object and its assignments, if any, and supply an identifier, such as the name of the object, and the date and time to which such object should be restored. In one embodiment, the user may specify if assignments are to be restored with the object and in which direction or directions: to the specified object, from the specified object or in both directions. User interface manager 422 receives such information and builds a restoration object that includes such information and provides the restoration object to attribute status manager 424. Other restoration specifications may be received, included in the restoration object, and used as described above.

When it receives the restoration object, attribute status manager 424 uses the information in reported information storage 420 and the object information in the restoration object to identify the former status of the attributes, including keys and/or values, of the object specified by the restoration object as of the date and time in the restoration object. In one embodiment, attribute status manager 424 isolates, and orders by date and time, the information in reported information storage that corresponds to the creation of the object and to changes of attributes of the object referred to by the restoration object, identifies the initial attribute status on creation of the object specified, and applies changes made to attributes of such object in the order in which such changes were recorded by their date and time. For example, as attribute values are changed or deleted, attribute status manager 424 also makes such changes and deletions in the order in which they were recorded. Attribute status manager 424 stores such keys, and/or values of each of the attributes into the restoration object, and provides the restoration object to assignment status manager 426. In one embodiment, if no date and time is specified in the restoration object, attribute status manager identifies the most recent deletion of the object corresponding to the object identifier in the restoration object, uses the time immediately preceding such date and time as the date and time to which the restoration should be made, and stores such date and time in the restoration object.

When it receives the restoration object, assignment status manager 426 isolates assignment information in reported information storage 420 corresponding to the object identified in the restoration object, orders by date and time recorded, and applies assignments made to or from such object to a table of assignments in the order in which they were recorded. Each row in the table of assignments indicates the direction of the assignment, and the identifier of the other object corresponding to such assignment. If one or more assignments is made as indicated by the recorded actions in reported information storage 420, assignment status manager 426 makes the assignment in the table of assignments using as many rows as needed. If one or more assignments is deleted as indicated by the recorded actions in reported information storage 420, assignment status manager 426 deletes the corresponding assignment in the table of assignments. In one embodiment, assignment manager 426 checks the directions of the assignments to be restored, and if no assignments are to be restored in either direction, it does not perform the isolating and ordering or assignment actions described above. If assignments in only one direction are to be restored, assignment status manager 426 only isolates and orders in reported information storage 420 assignments corresponding to that direction.

In one embodiment, before it makes an assignment between the object specified in the assignment and another object, assignment status manager 426 checks reported information storage 420 to identify whether the other object was deleted subsequent to its assignment to or from the object of the restoration object after the date and time the assignment was originally made, and if so, it does not add the corresponding entry for such other object in the table of assignments, unless the other object was restored to a point in time as of before or at the date and time of the restoration object being restored. Other embodiments may use other rules for omitting a restoration of an assignment. The other rules for restoration specified above may be used by assignment status manager, optionally as indicated in the restoration object.

Assignment status manager 426 adds the table of assignments to the restoration object and provides the restoration object to restoration manager 428.

When it receives the restoration object, restoration manager 428 uses the API to cause the base system 320 to create an object with the name or other identifier of the object that was initially added to the restoration object, optionally using the attribute keys and values stored in the restoration object as the attribute keys and values to be assigned to the object upon creation. If not so initially assigned, restoration manager 428 may use the API to cause the base system 320 assign the attribute values after the object is created. Restoration manager 428 uses the table of assignments, if any, to cause the base system to assign the object initially added to the restoration object to the other objects or assign the other objects to such object as indicated by the table of assignments so as to restore to the indicated date and time the assignment status to or from the object restored, to the extent indicated by the user.

Restoration manager 428 stores the identifier of the object initially added to the restoration object, the date and time specified in the restoration object, and an indication that the object was restored, to reported information storage 420, for use as described above.

In the event that other objects deleted are restored as described above, restoration manager 428 may use conventional recursion techniques to restore such objects by duplicating the information received from the user in a new restoration object, changing the object identifier to an object identifier which should be restored, and providing the object to attribute status manager to initiate the restoration process of the other object as described above, optionally repeatedly, until all such restorations are completed.

SUMMARY

There is shown a method of restoring an object to a first point in time, including: receiving at a first computer program, an indication of each of several actions taken or to be taken on a second computer program, on which the object resides or will reside, that does not have a capability to restore an object to a specified point in time, and that can be controlled by the first computer program, the several actions comprising making an association of the object with each of at least one different object; storing by the first computer program, information from the each of the several indications received, and for each such indication, a date and a time corresponding to a time approximately when the actions corresponding to the indications were taken; receiving at the first computer program a command to restore the object to a particular point in time, the command comprising an identifier of the object, an indication of the point in time, and an indication as to whether any associations to or from the object should be restored; and responsive to the identifier of the object in the command, the information from the several indications stored by the first computer system, the date and time of each of the several indications, and the point in time, providing from the first computer program to the second computer program, at least one command to take a set of at least one action causing the object to be restored as it existed on the second computer program at approximately the particular point in time except for any associations of that object at the point in time, and with at least one associations existing between the object and the at least one different object at the point in time additionally restored by the set of at least one command responsive to the indication of the command received.

The method includes optional features whereby: the indication as to whether any associations to or from the object should be restored comprises an indication that any associations to, but not from the object should be restored; the at least one association existing between the object and the at least one different object at the point in time that is additionally restored comprise at least one association with the at least one different object to, but not from, the object; and at least one association existing from the object to the at least one different object at the point in time is not restored responsive to the command.

The method includes optional features whereby: the indication as to whether any associations to or from the object should be restored comprises an indication that any associations from, but not to the object should be restored; the at least one association existing between the object and the at least one different object at the point in time that is additionally restored comprise at least one association from, but not to, the object; and at least one association existing to the object from the at least one different object at the point in time is not restored responsive to the command.

The method includes optional features whereby the first computer program and second computer program communicate via an applications programming interface of the second computer program.

The method includes optional features whereby the particular point in time is inferred from an action that had been performed on the object.

The method includes optional features including not restoring at least one association made between the object and at least one of the at least one different object that was deleted after the association was made and were not restored to an additional point in time after the assignment was made and before the point in time, where said at least one association corresponds to the indication in the command.

There is shown a system for restoring an object to a first point in time, including: a reported information receiver having an input coupled to a computer program for receiving from the computer program an indication for each of several actions taken or to be taken on the computer program, on which the object resides or will reside, that does not have a capability to restore an object to a specified point in time, and that can be controlled by the first computer program, the several actions comprising making an association of the object with each of at least one different object, the reported information receiver for storing via an output, information from the each of the several indications received, and for each such indication, a date and a time corresponding to a time approximately when the actions corresponding to the indications were taken; a user interface manager having an input for receiving a command to restore the object to a particular point in time, the command indicating the point in time and having an indication as to whether any associations to or from the object should be restored, the user interface manager for providing at an output an identifier of the object, the point in time and the indication as to whether any associations to or from the object should be restored; an attribute status manager having an input coupled to the user interface manager output for receiving the identifier of the object and the point in time, and coupled to the reported information receiver output for receiving the information from each of at least some of the several indications, and the dates and times of said indications, the attribute status manager for, responsive to the identifier of the object in the command, the information from the at least some of the several indications received at the attribute status manager input, the date and time of the at least some of the several indications, and the point in time, identifying at an output at least one attribute of the object as it existed at the point in time, and providing at the attribute status manager output the identifier of the object; an assignment status manager having an input coupled to the user interface manager output for receiving the identifier of the object, the point in time and the indication as to whether any associations to or from the object should be restored, and coupled to the reported information receiver output for receiving the information from each of at least some of the several indications and the dates and times of said indications, the attribute status manager for, responsive to the identifier of the object in the command, the information from the at least some of the several indications received at the attribute status manager input, the date and time of the at least some of the several indications, the point in time, and the indication as to whether any associations to or from the object should be restored, identifying at an output at least one indication of association of the object as it existed at the point in time that corresponds to the indication as to whether any associations to or from the object should be restored; and a restoration manager having an input coupled to the attribute status manager output for receiving the at least one attribute of the object as it existed at the point in time and the identifier of the object; and to the assignment status manager output for receiving the at least one indication of the at least one association of the object as it existed at the point in time that corresponds to the indication as to whether any associations to or from the object should be restored, the restoration manager for providing at an output coupled to the computer program, at least one command to take a set of at least one action causing the object to be restored as it existed on the computer program at approximately the particular point in time except for any associations of that object at the point in time, and with associations existing between the object and the at least one different object at the point in time additionally restored by said at least one command responsive to the indication of the command, responsive to the attributes of the object as it existed at the point in time and the at least one indication of associations of the object as it existed at the point in time that correspond to the indication as to whether any associations to or from the object should be restored.

The system includes optional features whereby: the indication as to whether any associations to or from the object should be restored comprises an indication that any associations to, but not from the object should be restored; and the at least one association that assignment status manager identifies at the assignment status manager output comprises at least one association to the object and from the at least one different object that existed at the point in time but not at least one association that existed from the object and to the at least one different object at the point in time.

The system includes optional features whereby: the indication as to whether any associations to or from the object should be restored comprises an indication that any associations from, but not to the object should be restored; the at least one association that assignment status manager identifies at the assignment status manager output comprises at least one association from the object and to the at least one different object that existed at the point in time but not at least one association that existed to the object and from the at least one different object at the point in time.

The system includes optional features whereby the restoration manager and the computer program communicate via an applications programming interface of the second computer program.

The system includes optional features whereby the particular point in time is inferred from an action that had been performed on the object.

The system includes optional features whereby the assignment status manager does not provide at the assignment status manager output at least one indication of at least one association made with at least one of the at least one different object that was deleted after the association was made and was not restored to an additional point in time after the assignment was made and before the point in time, where said at least one association not provided corresponds to the indication in the command.

There is shown a computer program product comprising a computer useable medium having computer readable program code embodied therein for restoring an object to a first point in time, the computer program product including computer readable program code devices configured to cause a computer system to: receive at a first computer program, an indication of each of several actions taken or to be taken on a second computer program, on which the object resides or will reside, that does not have a capability to restore an object to a specified point in time, and that can be controlled by the first computer program, the several actions comprising making an association of the object with each of at least one different object; store by the first computer program, information from the each of the several indications received, and for each such indication, a date and a time corresponding to a time approximately when the actions corresponding to the indications were taken; receive at the first computer program a command to restore the object to a particular point in time, the command comprising an identifier of the object, an indication of the point in time, and an indication as to whether any associations to or from the object should be restored; and responsive to the identifier of the object in the command, the information from the several indications stored by the first computer system, the date and time of each of the several indications, and the point in time, provide from the first computer program to the second computer program, at least one command to take a set of at least one action causing the object to be restored as it existed on the second computer program at approximately the particular point in time except for any associations of that object at the point in time, and with at least one associations existing between the object and the at least one different object at the point in time additionally restored by the set of at least one command responsive to the indication of the command received.

The computer program product includes optional features whereby: the indication as to whether any associations to or from the object should be restored comprises an indication that any associations to, but not from the object should be restored; the at least one association existing between the object and the at least one different object at the point in time that is additionally restored comprise at least one association with the at least one different object to, but not from, the object; and at least one association existing from the object to the at least one different object at the point in time is not restored responsive to the command.

The computer program product includes optional features whereby: the indication as to whether any associations to or from the object should be restored comprises an indication that any associations from, but not to the object should be restored; the at least one association existing between the object and the at least one different object at the point in time that is additionally restored comprise at least one association from, but not to, the object; and at least one association existing to the object from the at least one different object at the point in time is not restored responsive to the command.

The computer program product includes optional features whereby the first computer program and second computer program communicate via an applications programming interface of the second computer program.

The computer program product includes optional features whereby the particular point in time is inferred from an action that had been performed on the object.

The computer program product optionally additional includes computer readable program code devices configured to cause the computer system to not restore at least one association made between the object and at least one of the at least one different object that was deleted after the association was made and were not restored to an additional point in time after the assignment was made and before the point in time, where said at least one association corresponds to the indication in the command.

What is claimed is:

1. A method of restoring an object to a first point in time, comprising:
   receiving at a first computer program, an indication of each of a plurality of actions taken or to be taken on a second computer program, on which the object resides or will reside, that does not have a capability to restore the object to a specified point in time, and that can be controlled by the first computer program, the plurality of actions comprising making an association of the object with each of at least one different object;
   storing by the first computer program, information from the each of the plurality of indications received, and for each such indication, a date and a time corresponding to a time approximately when the action corresponding to the indication was taken;
   receiving at the first computer program a command to restore the object to a particular point in time, the command comprising an identifier of the object, an indication of the point in time, and an indication as to whether any associations to or from the object should be restored; and
   responsive to the command received, using the identifier of the object in the command, the information from the plurality of indications stored by the first computer system, the date and time of each of the plurality of indications, and the point in time, to provide from the first computer program to the second computer program, at least one command to take a set of at least one action causing the object to be incorporated into the second computer program as it existed on the second computer program at approximately the particular point in time except for any associations of that object at the point in time, and with at least one association existing between the object and the at least one different object at the point in time additionally incorporated into the second computer program using the set of at least one command, responsive to the indication of the command received, and at least one of the plurality of indications of an action comprising deleting the object, at least one of the at least one indications having a stored date and time after the point in time.

2. The method of claim 1, wherein the at least one association existing between the object and the at least one different object at the point in time is incorporated in to the second computer program additionally responsive to an incorporation into the second computer program of the at least one different object directed by the first computer program.

3. The method of claim 2 wherein the at least one association existing between the object and the at least one different object at the point in time is incorporated in to the second computer program additionally responsive to a different point in time corresponding to the incorporation.

4. The method of claim 3 wherein the at least one association existing between the object and the at least one different object at the point in time is incorporated in to the second computer program additionally responsive to the different point in time of the incorporation being on or before the point in time.

5. A system for restoring an object to a first point in time, comprising:
   a reported information receiver having an input coupled to a computer program for receiving from the computer program an indication for each of a plurality of actions taken or to be taken on the computer program, on which the object resides or will reside, that does not have a capability to restore the object to a specified point in time, and that can be controlled by the system, the plurality of actions comprising making an association of the object with each of at least one different object, the reported information receiver for storing via an output, information from the each of the plurality of indications received, and for each such indication, a date and a time corresponding to a time approximately when the action corresponding to the indication was taken;
   a user interface manager having an input for receiving a command to restore the object to a particular point in time, the command indicating the point in time and having an indication as to whether any associations to or from the object should be restored, the user interface manager for providing at an output an identifier of the object, the point in time and the indication as to whether any associations to or from the object should be restored;
   an attribute status manager having an input coupled to the user interface manager output for receiving the identifier of the object and the point in time, and coupled to the reported information receiver output for receiving the information from each of at least some of the plurality of indications, and the dates and times of said indications, the attribute status manager for, using the identifier of the object in the command, the information from the at least some of the plurality of indications received at the attribute status manager input, the date and time of the at least some of the plurality of indications, and the point in time, to identify at an output at least one attribute of the object as it existed at the point in time, and providing at the attribute status manager output the identifier of the object;
   an assignment status manager having an input coupled to the user interface manager output for receiving the identifier of the object, the point in time and the indication as to whether any associations to or from the object should be restored, and coupled to the reported information receiver output for receiving the information from each of at least some of the plurality of indications and the dates and times of said indications, the assignment status manager for, responsive to receipt of the identifier of the object, the information from the at least some of the plurality of indications received at the assignment status manager input, the date and time of the at least some of the plurality of indications, the point in time, and the indication as to whether any associations to or from the object should be restored, identifying at an output at least one indication of association of the object as it existed at the point in time that corresponds to the indication as to whether any associations to or from the object should be restored, excluding associations of one or more objects that were deleted after the point in time as indicated by the information from each of at least some of the plurality of indications; and a restoration manager having an input coupled to the attribute status manager output for receiving the at least one attribute of the object as it existed at the point in time and the identifier of the object; and to the assignment status manager output for receiving the at least one indication of the at least one association of the object as it existed at the point in time that corresponds to the indication as to whether any associations to or from the object should be restored, the restoration manager for providing at an output coupled to the computer program, at least one command to take a set of at least one action causing the object to be incorporated into the second computer program as it existed on the computer program at approximately the particular point in time except for any associations of that object at the point in time, and with associations existing between the object and the at least one different object at the point in time additionally incorporated into the second computer program by said at least one command responsive to the indication of the command, responsive to the attributes of the object as it existed at the point in time and the at least one indication of associations of the object as it existed at the point in time that correspond to the indication as to whether any associations to or from the object should be restored.

6. The system of claim 5, wherein the assignment status manager excludes the one or more associations additionally responsive to an incorporation into the second computer program of the at least one different object directed by the first computer program.

7. The system of claim 6, wherein the assignment status manager excludes the one or more associations additionally responsive to a different point in time corresponding to the incorporation.

8. The system of claim 7, wherein the assignment status manager excludes the one or more associations additionally responsive to the different point in time of the incorporation being on or before the point in time.

9. A computer program product comprising a nontransitory computer useable medium having computer readable program code embodied therein for restoring an object to a first point in time, the computer program product comprising computer readable program code devices configured to cause a computer system to:

receive at a first computer program, an indication of each of a plurality of actions taken or to be taken on a second computer program, on which the object resides or will reside, that does not have a capability to restore an object to a specified point in time, and that can be controlled by the first computer program, the plurality of actions comprising making an association of the object with each of at least one different object;

store by the first computer program, information from the each of the plurality of indications received, and for each such indication, a date and a time corresponding to a time approximately when the action corresponding to the indication was taken;

receive at the first computer program a command to restore the object to a particular point in time, the command comprising an identifier of the object, an indication of the point in time, and an indication as to whether any associations to or from the object should be restored; and responsive to the command received, use the identifier of the object in the command, the information from the plurality of indications stored by the first computer system, the date and time of each of the plurality of indications, and the point in time, to provide from the first computer program to the second computer program, at least one command to take a set of at least one action causing the object to be incorporated into the second computer program as it existed on the second computer program at approximately the particular point in time except for any associations of that object at the point in time, and with at least one association existing between the object and the at least one different object at the point in time additionally incorporated into the second computer program using the set of at least one command, responsive to the indication of the command received, and at least one of the plurality of indications of an action comprising deleting the object, at least one of the at least one indications having a stored date and time after the point in time.

10. The computer program product of claim 9, wherein the at least one association existing between the object and the at least one different object at the point in time is incorporated in to the second computer program additionally responsive to an incorporation into the second computer program of the at least one different object directed by the first computer program.

11. The computer program product of claim 10, wherein the at least one association existing between the object and the at least one different object at the point in time is incorporated in to the second computer program additionally responsive to a different point in time corresponding to the incorporation.

12. The computer program product of claim 11, wherein the at least one association existing between the object and the at least one different object at the point in time is incorporated in to the second computer program additionally responsive to the different point in time of the incorporation being on or before the point in time.

* * * * *